United States Patent [19]
Tani et al.

[11] Patent Number: 5,606,160
[45] Date of Patent: Feb. 25, 1997

[54] SYMBOL READING DEVICE

[75] Inventors: Nobuhiro Tani; Harumi Aoki; Keiji Sawanobori, all of Tokyo, Japan

[73] Assignee: Asahi Kogaku Kogyo Kabushiki Kaisha, Tokyo, Japan

[21] Appl. No.: 428,664

[22] Filed: Apr. 25, 1995

Related U.S. Application Data

[62] Division of Ser. No. 218,227, Mar. 25, 1994, abandoned.

[30] Foreign Application Priority Data

| Mar. 25, 1993 | [JP] | Japan | 5-90620 |
| Mar. 25, 1993 | [JP] | Japan | 5-90621 |
| Mar. 25, 1993 | [JP] | Japan | 5-90622 |
| Mar. 25, 1993 | [JP] | Japan | 5-90623 |
| Mar. 25, 1993 | [JP] | Japan | 5-90624 |
| Mar. 25, 1993 | [JP] | Japan | 5-90625 |

[51] Int. Cl.$^6$ .................................................. G06K 7/10
[52] U.S. Cl. ........................................ 235/472; 235/462
[58] Field of Search ................................. 235/462, 472

[56] References Cited

U.S. PATENT DOCUMENTS

| 5,218,190 | 6/1993 | Hardesty | 235/462 |
| 5,272,322 | 12/1993 | Nishida | 235/462 |

*Primary Examiner*—Harold Pitts
*Attorney, Agent, or Firm*—Kane, Dalsimer, Sullivan, Kurucz, Levy, Eisele and Richard, LLP

[57] ABSTRACT

An encoded symbol reading device capable of reading and decoding a tessellated symbol. A detector detects an optical image formed by the encoded symbol and outputs a signal corresponding to the optical image. The signal is compared with threshold values and a 1-bit data value is output. The 1-bit data values are converted into an n-bit data value which is stored in a memory. The threshold values are also stored in memory and are obtained by detecting an optical image formed by a surface having a predetermined color.

3 Claims, 19 Drawing Sheets

F I G. 2
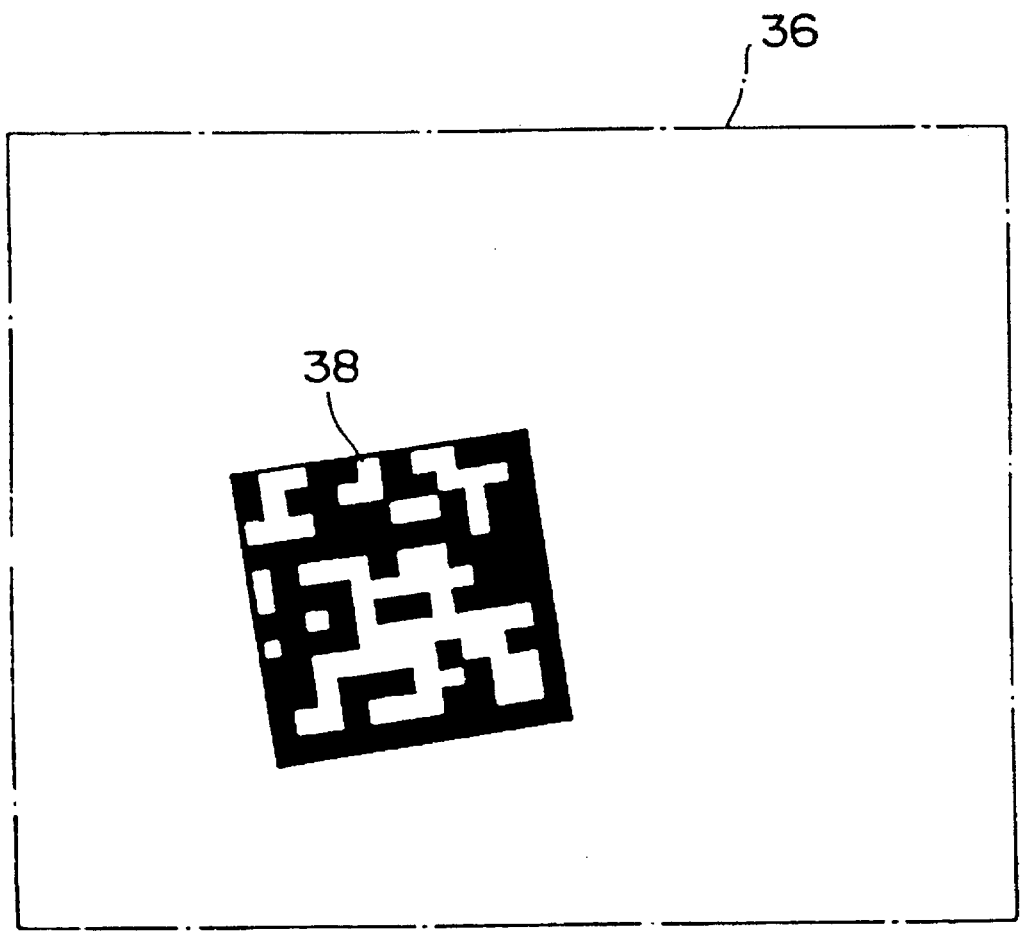

F I G. 15
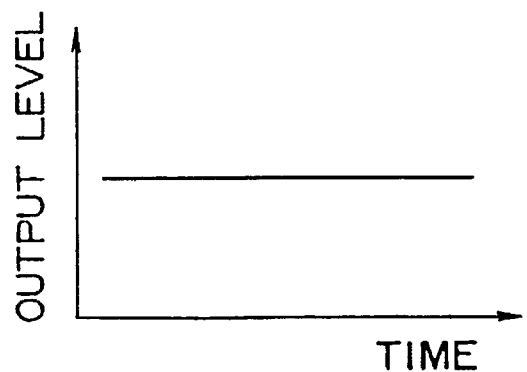
F I G. 16
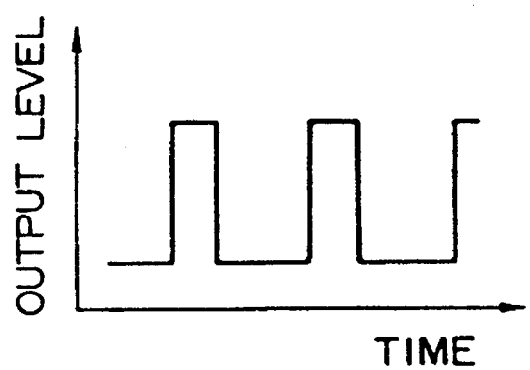
F I G. 17
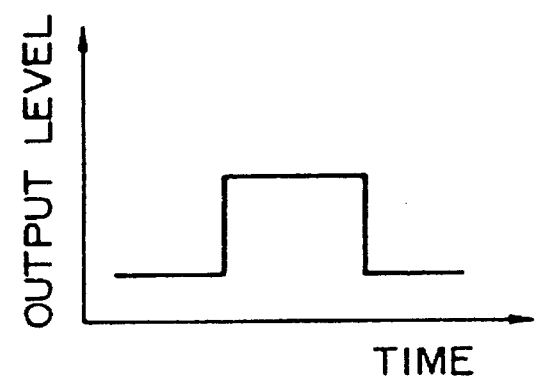

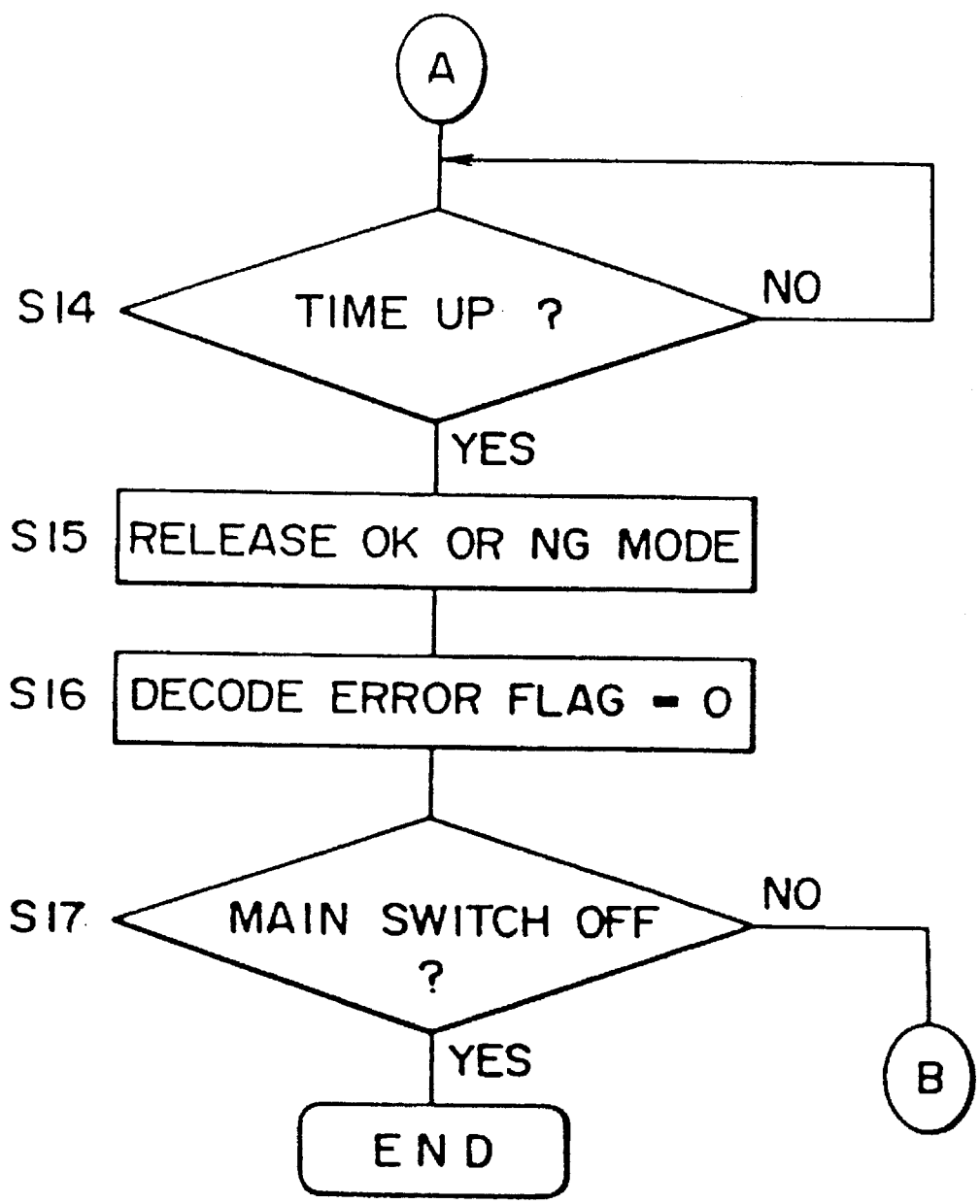

FIG. 20

| Analog Signal Level (V) | D1 | D2 | D3 | D4 |
|---|---|---|---|---|
| 0 | o | o | o | o |
| 1/3 | — | o | o | o |
| 2/3 | o | — | o | o |
| 1 | — | — | o | o |
| 4/3 | o | o | — | o |
| 5/3 | — | o | — | o |
| 2 | o | — | — | o |
| 7/3 | — | — | — | o |
| 8/3 | o | o | o | — |
| 3 | — | o | o | — |
| 10/3 | o | — | o | — |
| 11/3 | — | — | o | — |
| 4 | o | o | — | — |
| 13/3 | — | o | — | — |
| 14/3 | o | — | — | — |
| 5 | — | — | — | — |

FIG. 21

|    | $A_1$ | $A_2$ |
|----|-------|-------|
| $P_1$ | 0 | 1 |

FIG. 22

|    | $A_1$ | $A_2$ | $A_3$ |
|----|-------|-------|-------|
| $P_1$ | 0 | 1 | 0 |
| $P_2$ | 0 | 0 | 1 |

SYMBOL READING DEVICE

This is a division of application Ser. No. 08/218,227, filed Mar. 25, 1994, now abandoned.

BACKGROUND OF THE INVENTION

The present invention relates to an encoded symbol reading device which is capable of reading encoded symbols having tessellated pattern codes, which are an encoded representation of alphanumeric information.

There are available hand-held encoded symbol reading devices which have an image sensor such as a charge coupled device CCD for reading and decoding two dimensional tessellated pattern codes having a grid-like pattern of white and black areas, where the pattern changes in both the horizontal (X-axis) and vertical (Y-axis) directions.

One general hand-held encoded symbol reading device has a casing with an opening defined at one end which is covered with a transparent plastic panel. The casing houses therein a CCD image sensor facing the opening and electrically connected to a signal processor, a plurality of light-emitting diodes (LEDs), and a condensing lens positioned in front of a photodetector surface of the CCD. Light is emitted from the LEDs and applied through the opening to a two-dimensional encoded symbol such as a bar code that is to be read by the encoded symbol reading device. The light is reflected by the encoded symbol back into the opening, and focused by the condensing lens onto the photodetector surface of the CCD. The CCD converts the applied light into Image signals, which are then converted by the signal processor into a digital signal. The digital signal is then decoded, and the original alphanumeric information can be retrieved.

Conventionally, the sensor performs a line scan on the tessellated pattern code. After scanning each line the data is stored sequentially in a memory. In order to decode the information stored in the memory, a complex data marking system is employed to separate data corresponding to each scanned line, from data corresponding to an adjacent scanned line. However, if any of the data markers become corrupted, all the data stored in the memory will be made invalid, since the demarcation of the scanning line data is no longer possible. The symbol must therefore be read again, which makes the process of reading the encoded symbols time consuming and bothersome.

SUMMARY OF THE INVENTION

It is therefore an object of the present invention to provide an encoded symbol reader that can accurately decode a two-dimensional symbol, and which has a simple construction.

For the above object, according to an aspect of the present invention, there is provided an apparatus for decoding an encoded symbol and for displaying data on a video monitor, said apparatus comprises:

an encoded symbol reading device capable of reading and decoding a tessellated symbol, said device comprising means for detecting an optical image formed by said encoded symbol, said detecting means outputting image data corresponding to optical image; and means for outputting a video signal to a video monitor corresponding to said output image data.

According to another aspect of the present invention there is provided an encoded symbol reading device, comprising:

means for detecting an optical image of said encoded symbol, and outputting image data corresponding to said optical image;

means for generating an evaluated data used for decoding by comparing said image data with a threshold data: and means for storing said threshold data, wherein said threshold data is an image data of a predetermined reference symbol detected by said detecting means.

According to a further aspect of the present invention there is provide an encoded symbol reading device capable of reading and decoding a tessellated symbol, said device comprising:

means for detecting an optical image formed by said encoded symbol, said detecting means outputting a signal corresponding to said optical image;

means for adjusting an amount of light projected by said optical image and detected by said detecting means; and storing means for storing data related to adjustment of said amount of light.

According to a still further aspect of the present invention there is provided an encoded symbol reading device capable of reading and decoding a tessellated symbol, said device comprising:

means for detecting an optical image formed by said encoded symbol, said detecting means outputting a signal corresponding to said optical image;

means for comparing said signal output by said light detecting means with a plurality of threshold data, said comparing means outputting 1-bit data;

means for storing sample data; and means for selecting a test mode, wherein when said test mode is selected, said comparing means compares said sample data with said threshold values.

According to a still further aspect of the present invention, there is provide an encoded symbol reading device capable of reading and decoding a tessellated symbol, said device comprising:

means for detecting an optical image by said encoded symbol, said detecting means outputting image data corresponding to said optical image;

means for comparing said data output by said detecting means with a plurality of threshold values, said comparing means outputting a 1-bit data value;

means for converting n of said 1-bit data values into an n-bit data value:

means for storing said n-bit data values; and means for generating a horizontal synchronous signal and a vertical synchronous signal, said horizontal and vertical synchronous signals used to determine an address of said storing means where said n-bit data is to be stored.

According to a still further aspect of the invention there is provided an apparatus for decoding an encoded symbol and for displaying data on a video monitor, said apparatus comprising:

an encoded symbol reading device capable of reading and decoding a tessellated symbol, said device comprising:

means for detecting an optical image formed by an encoded symbol, said detecting means outputting image data corresponding to said optical image;

means for comparing said data output by said light detecting means with a plurality of threshold values, said comparing means outputting a 1-bit data value;

means for converting n of said 1-bit data values into an n-bit data value;

means for storing said n-bit data values; and means for adjusting an amount of light projected by said optical image and detected by said detecting means:

storing means for storing data related to adjustment of said amount of light;

means for storing sample data;

means for selecting a test mode;

means for generating a horizontal synchronous signal and a vertical synchronous signal;

means for storing said threshold values, wherein said horizontal and vertical synchronous signals used to determine an address of said storing means where said n-bit data is to be stored, wherein said threshold values are obtained by said device by emitting light onto a surface having a predetermined color and wherein when said test mode is selected, said comparing means compares said sample data with said threshold values; and means for outputting a video signal to a video monitor corresponding to said output image data.

According to further aspect of the invention, there is provided an encoded symbol reading device, comprising:

means for detecting an optical image of said encoded symbol and outputting image data corresponding to said optical image;

means for generating an evaluated data used for decoding by comparing said Image data with a threshold data; and means for storing said threshold data, wherein said threshold data is an image data of a predetermined reference symbol detected by said detecting means.

DESCRIPTION OF THE ACCOMPANYING DRAWINGS

FIG. 2 shows a reading area and a symbol to be read by the reading device;

FIG. 15 is a graph showing a waveform of an example of a reference video signal;

FIG. 16 is a graph showing a waveform of an example of a reference video signal;

FIG. 17 is a graph showing a waveform of an example of a reference video signal;

FIGS. 18A and 18B are flowcharts illustrating the main operation of the encoded symbol reading device;

FIG. 20 shows the relationship between the serial data as shown in FIG. 12 and an analog signal level;

FIG. 21 shows the relationship between the value of the bit P1 shown in FIG. 12 and the selection of lines A1 and A2 shown in FIG. 9; and FIG. 22 shows the relationship between the value of the bits P1 and P2 shown in FIG. 14 and the selection of lines A1, A2 and A3 shown in FIG. 13.

DESCRIPTION OF THE EMBODIMENTS

Figure 1:
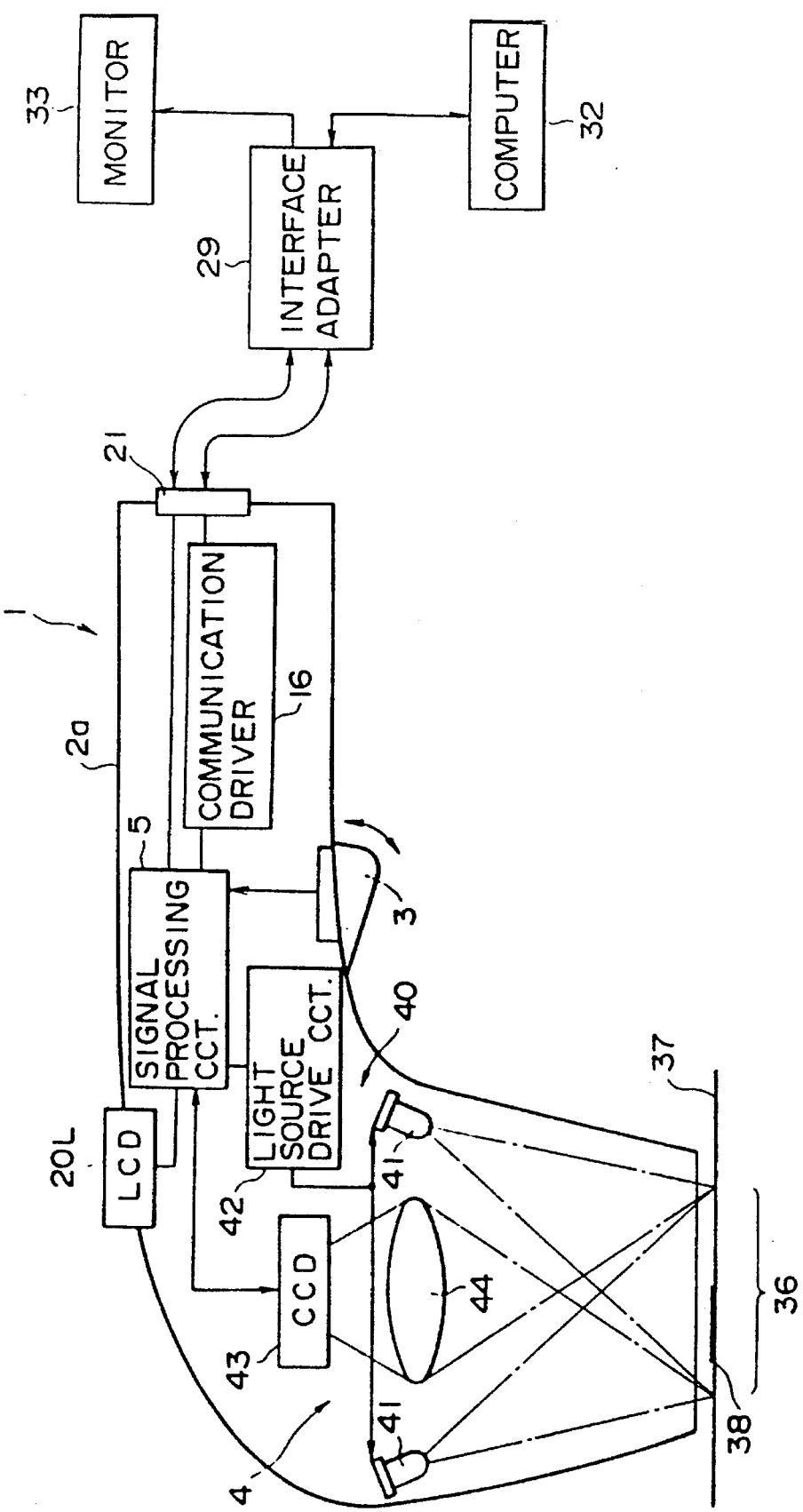
FIG. 1 is a diagram of a symbol reading device according to the present invention.

FIG. 1 is a block diagram of a symbol reading device embodying the present invention. The symbol reading device 1 has a casing 2, in which a light projection unit 40 and a reading unit 4 for reading a data symbol 38 are integrally provided.

The light projection unit 40 has a pair of light sources 41 and 41, and a light source driving circuit 42. An LED (light emitting diode), a halogen lamp, a semiconductor laser or the like can be used as the light source. Although there are two light sources in the embodiment, the light projection unit 40 can be modified to have only one light source. Further, if the ambient light is bright enough, the light source is not required, since sufficient light is available for the data symbol to be read. Further, if an encoded symbol is backlit and therefore an optical image is projected, the optical Image can be read by the reading unit and the symbol can be decoded.

Between the pair of light sources 41 and 41, a CCD (Charge Coupled Device) 43 and the reading unit 4 are provided. The CCD 43 functions as an area sensor. The reading unit 4 includes an optical system 44 through which light reflected from a reading area 36 is directed to the CCD 43. In the CCD 43, a plurality of imaging sensing elements (hereinafter referred to as pixels) are arranged in matrix. Each pixel of the CCD 43 accumulates an electrical charge in accordance with the intensity of the received light. The charge accumulated in each pixel is subsequently discharged to form an image signal.

In the embodiment, the sensitivity of the CCD 43 is sufficient if the brightness of the entire area of the data symbol 38 can be distinguished. It is also possible to use a colored data symbol and a color sensitive CCD for decoding more complicated data.

The optical system consists of various optical elements such as a lens, a prism, a filter, a mirror, and the like.

When the pair of light sources 41 and 41 are driven by the light source driving circuit 42, the data symbol 38 (the reading area 36) is illuminated with light emitted by the light sources 41 and 41. The reflected light from the reading area 36 is focused on the light receiving surface of the CCD 43 by the optical system 44. The CCD 43 outputs an image signal (analog Image signal) in accordance with the intensity of the received light. The output signal is fed to the signal processing circuit 5 where it is converted to a digital signal.

Figure 3:
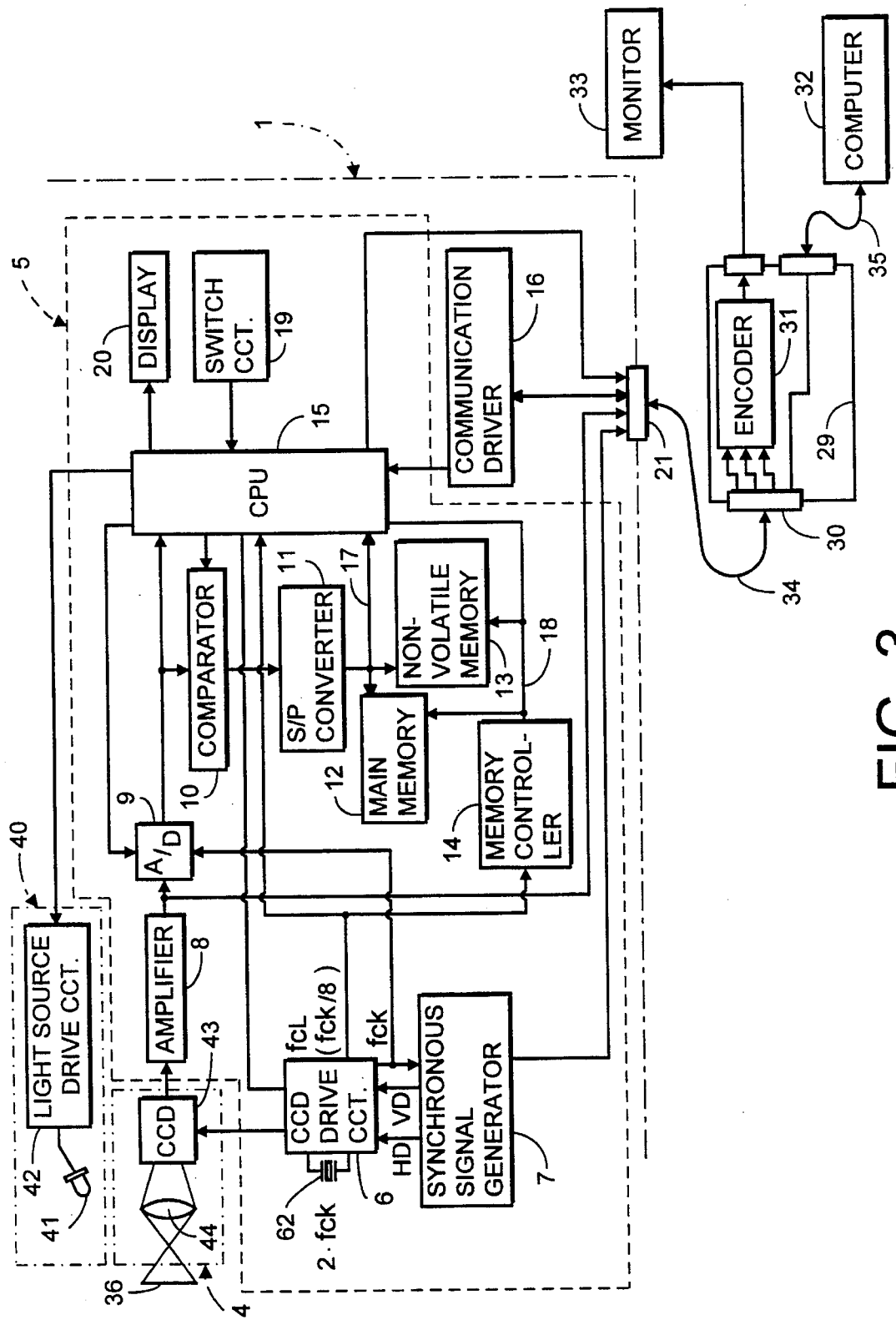
FIG. 3 is a diagram illustrating the electrical construction of the symbol reading device.

FIG. 3 shows a block diagram of the signal processing circuit 5 and the connections to the other elements of the encoded symbol reading device. The signal processing circuit 5 comprises a CCD drive circuit 6, a synchronous signal generator 7, an amplifier 8, a comparator 10, a serial/parallel converter 11, a main memory 12 a non-volatile memory (EEPROM) 13, a memory controller 14, a CPU 15, a switch circuit 19 and an LCD display driver 20.

The CCD drive circuit 6 generates a clock pulse having a frequency fCK. The clock fCK is transmitted to synchronous signal generator 7 and the A/D converter 9.

The synchronous signal generator 7 generates HD (horizontal sync.) and VD (vertical sync.) signals based on the clock fCK and transmits them to CCD drive circuit 6. A horizontal CCD drive signal is generated based on the clock fCK while the vertical CCD drive signal is generated based on the HD and VD signals. The horizontal and a vertical CCD drive signals are then output to the CCD 43.

In the CCD drive circuit 6, another clock fCL is generated by combining a divided clock fCK/8, VD and HD. This clock fCL is output to the memory controller 14 and the CPU 15. Further, the synchronous signal generator 7 generates a SYNC signal based on the clock fCK. The SYNC signal is outputted to terminal 21 where it is used by display 33 to display an image.

The image signal (analog) output by CCD 43 is amplified by an amplifier 8 and fed to the A/D converter 9 where it is converted into an 8 bit digital image signal (having 256 steps of gradation). The amplified image signal (analog) is also transmitted to the terminal 21.

The 8 bit digital Image signal is transmitted from the A/D converter 9 to a comparator 10. At the same time, threshold data is transmitted to the comparator 10 from the memory 13 via data bus 17 and the CPU 15. The 8 bit digital image signal is compared with the threshold data (also an 8 bit digital signal) and 1 bit digital data is generated.

The eight 1-bit digital data (binary quantized data) are converted into one 8-bit parallel data by the serial/parallel converter 11. The 8-bit parallel data is stored in main memory 12 in accordance with the address determined by the address counter of the memory controller 14. In this embodiment an 8-bit data bus is connected from the serial/parallel converter to the CPU 15, thus the serial/parallel converter outputs 8 bit data.

The memory 13 is an EEPROM, but any non-volatile memory device, including a magnetic/optical recording medium, may be used. If the latter type of recording medium is used, it is preferable that the data be loaded into a memory device (RAM) before being used.

The image data stored in main memory 12 is read out and processed (with various enhancements and decoded) in the CPU 15. The decoded data is transmitted to the terminal 21 via a communication driver, such as an RS-232C interface driver.

The memory controller 14 has an address counter which determines the address of the main memory 12. Data is written to the memory 12 synchronously with the combined clock fCL, at the address determined by the memory controller 14.

The CPU 15 has another address counter which determines the address of non-volatile memory 13 when threshold data is written to or read from the memory 13.

A switch circuit 19 comprises a main switch for turning the encoded symbol reading device on or off, a mode switch for switching between a read mode or a test mode, and a monitor switch for switching between a monitor through mode or a monitor cut mode. The switch circuit 19 further comprises an exposure switch for setting an exposure value, and a field/frame select switch for selecting between the method of storing the two fields of the frame.

The status of the monitor switch is inputted in the CPU 15. If the monitor cut mode is selected, a mute signal generator inside the CPU generates a HIGH signal, otherwise if the monitor through mode is selected, a LOW signal is generated. The mute signal is transmitted to the terminal 21.

If the monitor through mode is selected and the main switch is ON, the light source drive circuit 42 will drive the light sources 41 and 41 continuously. However. If the monitor cut mode is selected and the main switch is ON, the light sources 41 and 41 are driven only when a trigger switch 3 is ON.

A display unit 20 is controlled by the CPU 15 to display decoded information, NG/OK indication, date, shutter speed. etc. The display unit 20 has an LCD 20L.

The terminal 21 and an interface terminal 29 are connected with a cable 34. The image signal (analog), SYNC signal, and mute signal are inputted to an encoder 31, which generates an NTSC video signal which is output if the mute signal is OFF(LOW). If the mute signal is HIGH, the video signal is not transmitted to the display 33.

The decoded data which is also applied to the terminal 21, is transmitted to a computer 32 through the interface 29 and cable 35.

Figure 4:
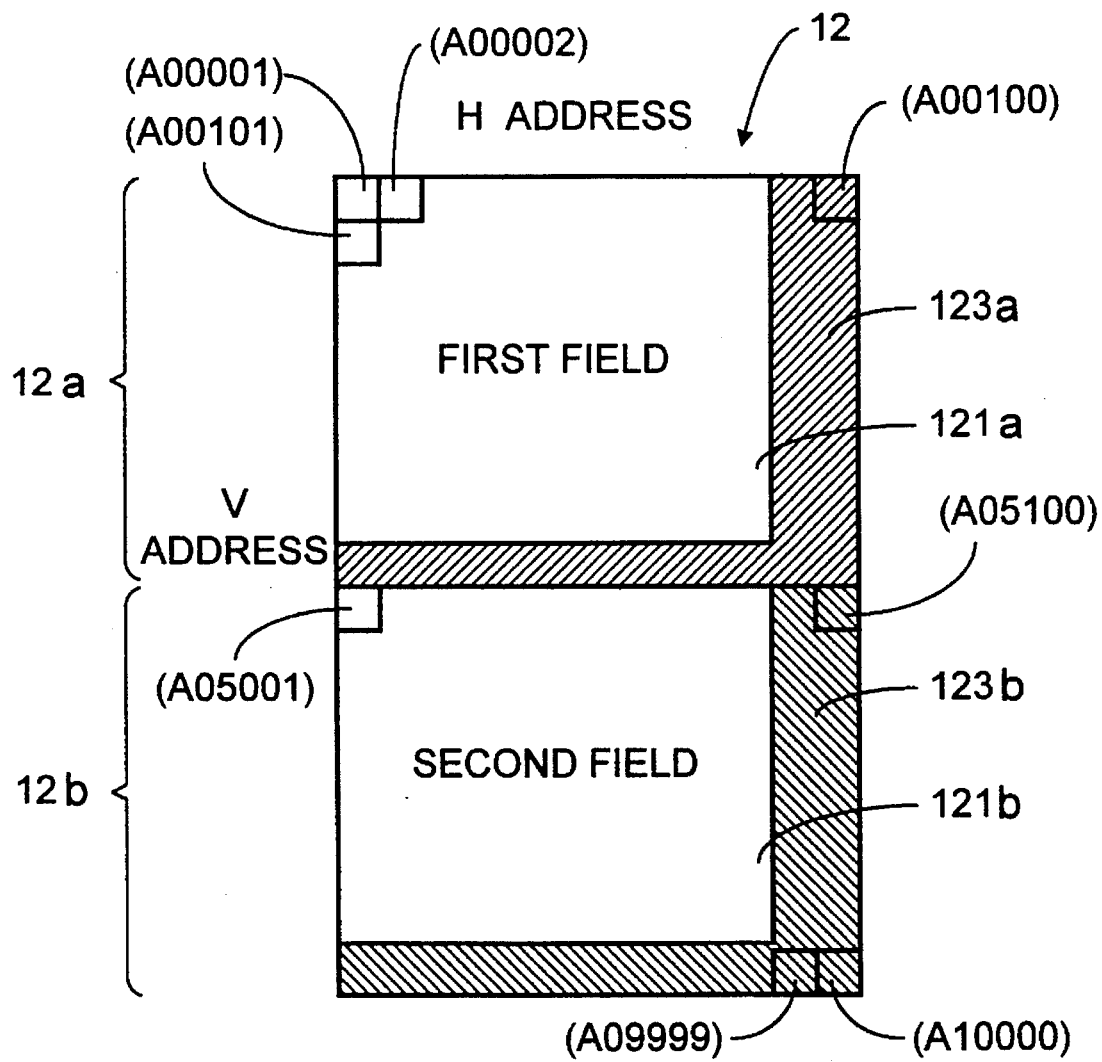
FIG. 4 is a diagram illustrating the relationship between the scanning fields and the memory addressing.

FIG. 4 illustrates the location of the first and second field data when stored in the main memory 12.

In the main memory 12, there are two storage areas: a first area 12a for the first field, and a second area 12b for the second field. The first area 12a includes an Image data storing area 121a and a blanking area 123a, and the second area 12b has an image data storing area 122b, and a blanking area 123b. The blanking areas 123a and 123b are to the right and bottom of the image storing areas 121a and 121b.

The address is controlled based on the clock fCL. More specifically, the address in the horizontal direction is updated based on the clock fCL. The CPU 15 controls the start of the writing of data corresponding to each scan line, the changing to the top of the succeeding line, and the changing to the other field.

The main memory 12 stores eight bits of binary data at each address in order to improve efficiency. As shown in FIG. 4, the address A00001 stores data corresponding to the leftmost 8 pixels of the first scanning line, and the address A00101 stores data corresponding to the leftmost 8 pixels of the second scanning line. This is repeated for all scanning lines. Thus the first image storing area 121a stores data corresponding to the first scanned field of the reading area 36. Similarly, the second Image storing area stores data corresponding to the second scanned field of the reading area 36.

When 8-bit data is stored in the main memory 12, the memory controller 14 determines the address based on the clock fCK/8. The CPU 15 controls the memory controller 14 based on the timing of the VD signal to initiate storing the data, thus the address is determined as (A00001) (see FIG. 4).

Initially, the address is set to A00001. The 8-bit parallel data for the first horizontal scan line is stored on the first line of memory. If there is more data for the first field, the remaining data is stored on the second line of memory. When the data for the second scan line is to be stored, the CPU 15 controls the memory controller 14 based on the HD signal, and the left-most address (A00101) is sent to the memory controller 14. The leftmost 8-bit data for the second scan horizontal line is stored at this address, overwriting any data that may have overflowed from the first scan line. This process is repeated for every horizontal scan line. Thus the leftmost 8-bit data is stored at the leftmost address for each scan line.

The data for the second field is stored in a similar manner in the second image memory area 121*b*. When the first field data has been stored, the CPU 15 controls the memory controller 14, based on the VD signal, to assign the address A05001 to the beginning of the second field.

As described above, the CPU 15 controls the memory controller 14 based on the clock fCL. It is possible to employ a memory controller which receives the clock fCL, or works synchronously with the horizontal and vertical synchronous signals.

The CPU 15 reads the data stored as above synchronously with a clock which is different from the clock fCL, but which is the same as the one used for image processing. In this embodiment, the CPU 15 can assign the address and read the data.

To read the data, the CPU 15 controls the memory controller 14 to assign the address from which the data is read. Accordingly, the address of the top left of the first field (A00001) is assigned. Then the data is read from left to right, and top to bottom.

As described above, the image data of the left edge of each scan line is written at the left portion of the memory 12. Thus the position of a point on the light receiving area of the CCD 43 corresponds to a position on the first or second field of the main memory 12. As a result. It becomes easy to process the image data, the processing circuit may be simplified, and the processing speed will increase.

Before reading an encoded symbol, the encoded symbol reading device must obtain threshold data. The threshold data is obtained by reading a white chart with exposure time set to half that required when an actual symbol is read. The exposure time can be adjusted by changing the shutter speed (integration time of the CCD). Thus if the data symbol is read at a shutter speed of 1/60 sec., the threshold data is obtained using a shutter speed of 1/125 sec.

Figure 5:
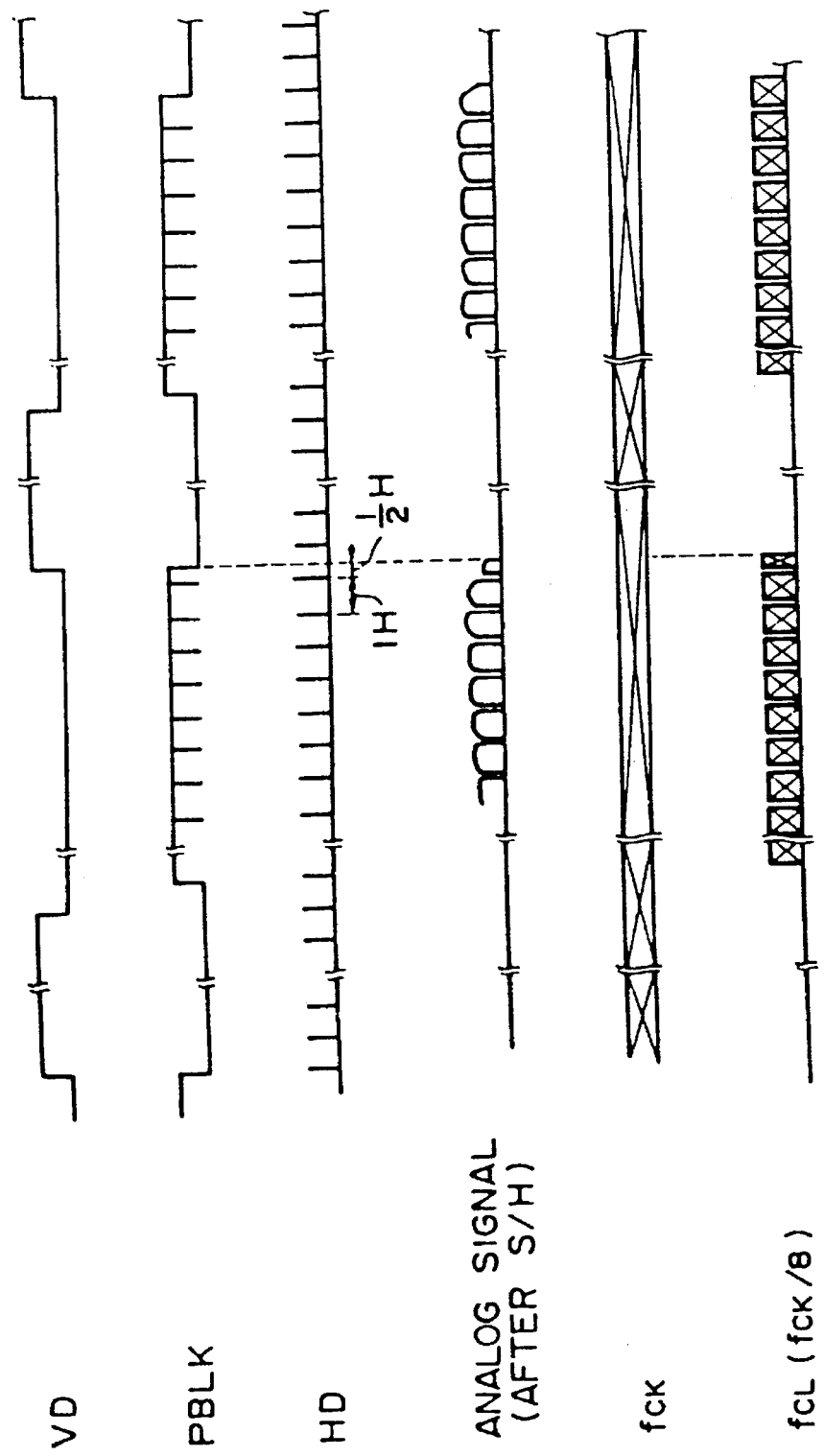
FIG. 5 is a timing chart showing the generation of threshold data.

By reading the test chart, the analog image signal is obtained as shown in FIG. 5. This analog image signal is converted to 8-bit digital signals synchronously with the clock signal fCK. In other words, the analog signal is sampled based on the clock fCK, and A/D converted. As described above, the HD and VD signals are synchronized with the clock fCK.

Figure 6:
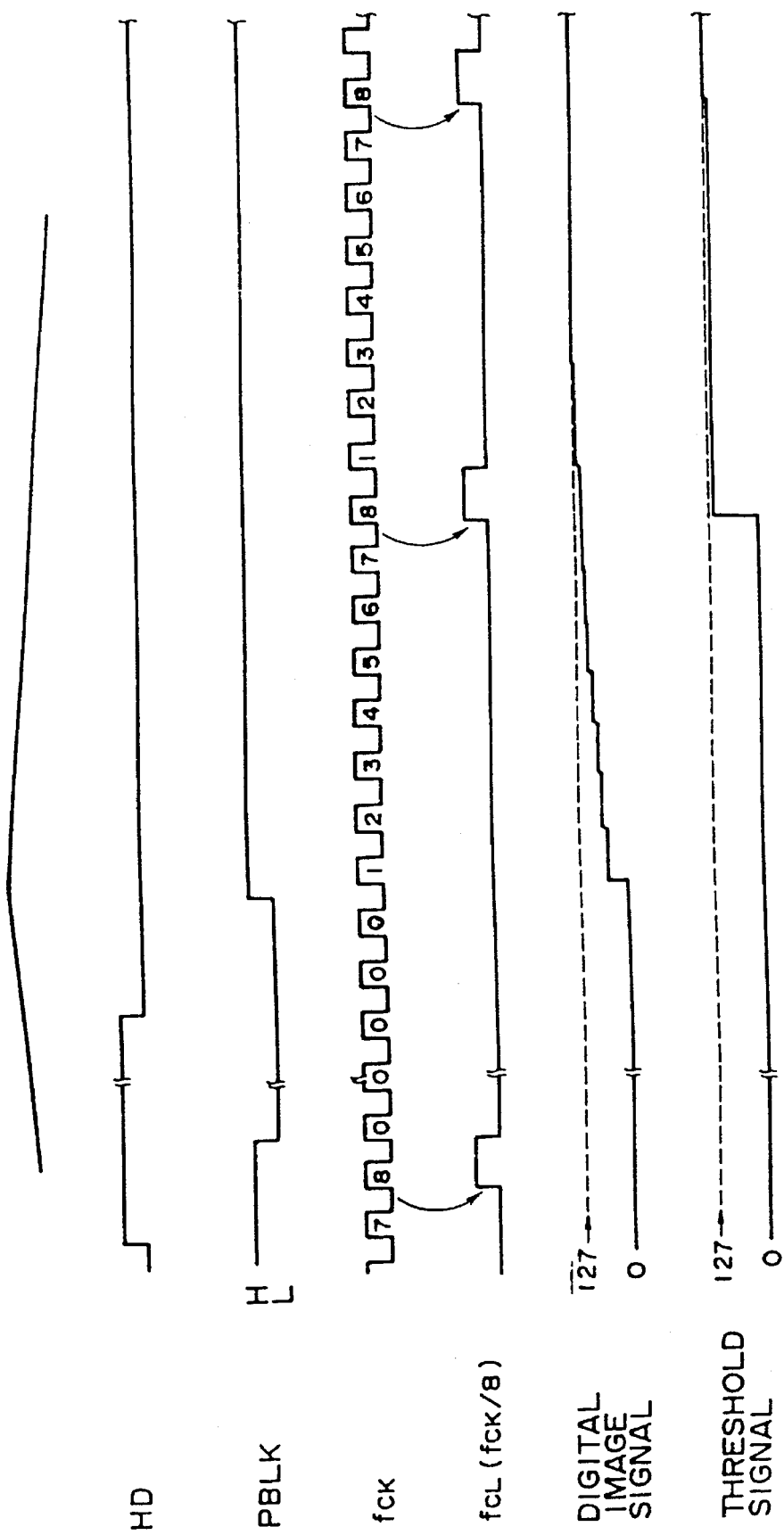
FIG. 6 is shows a portion of the data illustrated in FIG. 5, on an expanded time scale.

The 8-bit digital signal is obtained as shown in the expanded time scale chart of FIG. 6. The value of the 8-bit digital data is approximately 127, which corresponds to gray when the shutter speed is 1/60.

In this embodiment, the image data is detected on the rising edge of the clock fCL pulse, and stored as the threshold value in the non-volatile memory 13 via a data bus 17. This 8-bit value represents a brightness level of one pixel, and is therefore different from the 8-bit data output by the serial/parallel converter. The address of the memory 13 when the threshold data is written, is generated by an address counter provided in the CPU 15. Thus each 8-bit data is used as the threshold data for 8 pixels, read between two adjacent fCL clock pulses (see FIG. 6).

A pre-blanking signal PBLK is generated by combining the HD and VD signals. The PBLK signal is used for synchronizing the clock fCL to the HD and the VD signals. As shown in FIG. 6, while the PBLK is Low, blanking of the clock fCL occurs. While the PBLK is High, the clock fCK is divided, and based on the divided clock signal, the clock fCL which is synchronized with the HD and VD signals, is generated.

Further, for the of the clock fCK shown in FIG. 6, pulses labeled "0" are ignored, and those labeled "1" through "8" are divided. Thus the clock signal fCL which is synchronized with the lid signal is obtained. In this embodiment, the clock signal fCL and the HD signal have a constant phase difference.

Since the data detected for every eighth pixel is used as the threshold data, the memory storage requirements are greatly reduced. Therefore, the threshold data is written or read out synchronously with the clock fCL, which has a frequency fCK/8, and which is synchronized with the HD and VD signals. Thus, memory space is saved, and the memory access time is reduced. If sufficient memory space is available, the memory may be controlled to store the threshold data of all the pixels.

Figure 18A:
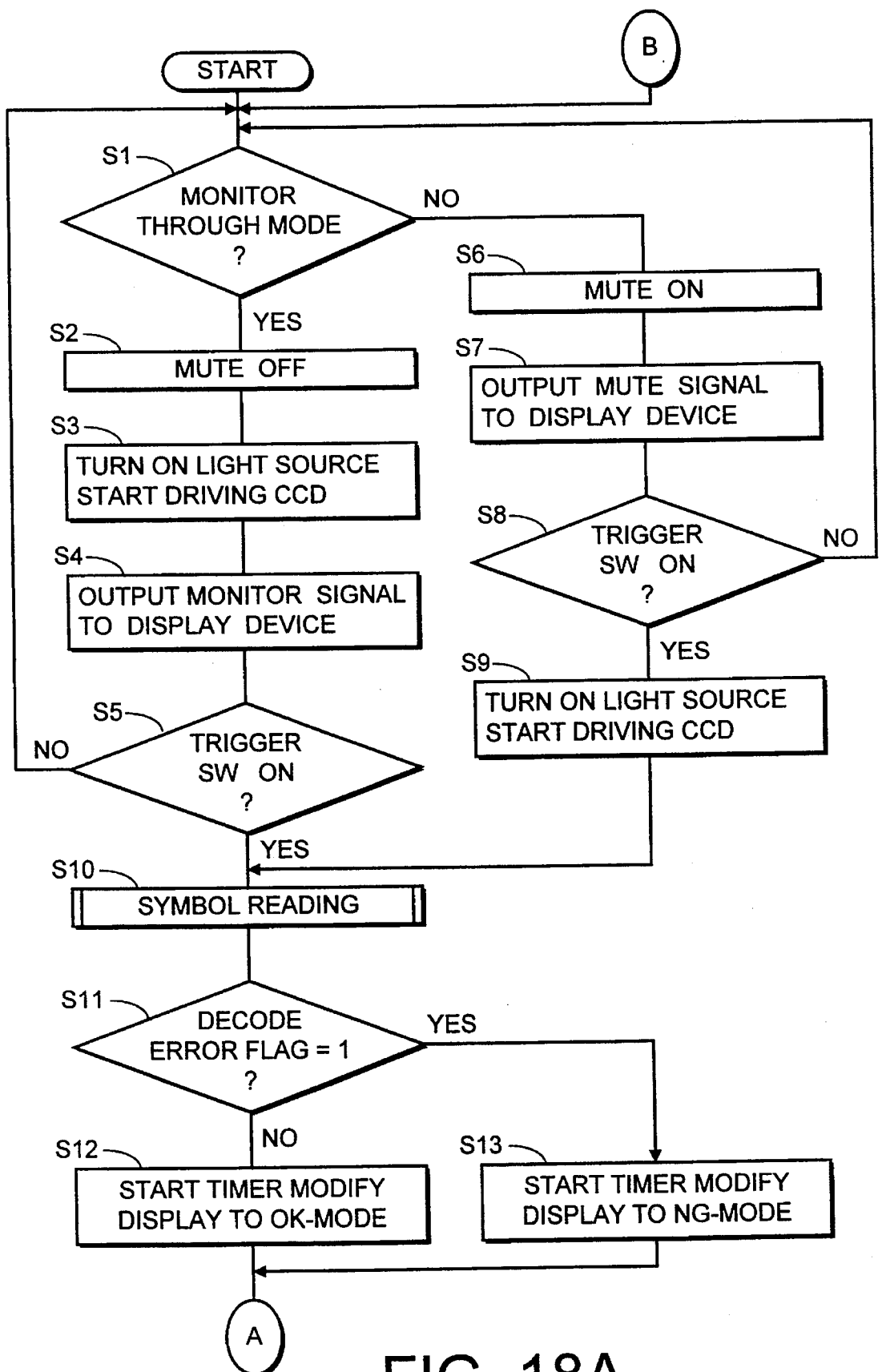

The operation of the encoded symbol reading device will be described below with reference to FIGS. 18A, and 18B.

The encoded symbol reading device is turned on. If the monitor through mode is selected in S1, then mute is turned off in S2. The light sources 41, 41 are turned on and the CCD 43 is driven in S3. The output monitor signal is sent to the display device 33 in S4. At S5, it is determined whether the trigger switch 3 is on. If it is ON, control proceeds to S10 where the symbol reading subroutine is initiated. If the trigger switch is OFF, control returns to S1 and the process repeats as described above.

If the monitor through mode is not selected (S1:N), the mute signal is turned on in S6 and output to the terminal 21 in S7. The interface terminal 29 uses the mute signal to determine whether the output image signal should be sent to the display device 33. If the trigger switch 3 is ON in S8, control proceeds to S9 where light sources 41, 41 are turned on and the CCD 43 is driven. Control then goes to S10 where the symbol reading subroutine is initiated. If the trigger switch 3 is not turned on, control goes to S1.

The symbol reading subroutine will be explained with reference to FIGS. 19A and 19B.

At S101, the CCD 43 is charged by the CCD drive circuit 6. The synchronous generator 7 outputs the VD signal at S102. The first field data is then read by the CCD 43 and transferred to the A/D converter. Simultaneously, the CCD 43 is charged in order to read the second field data.

Figure 7:
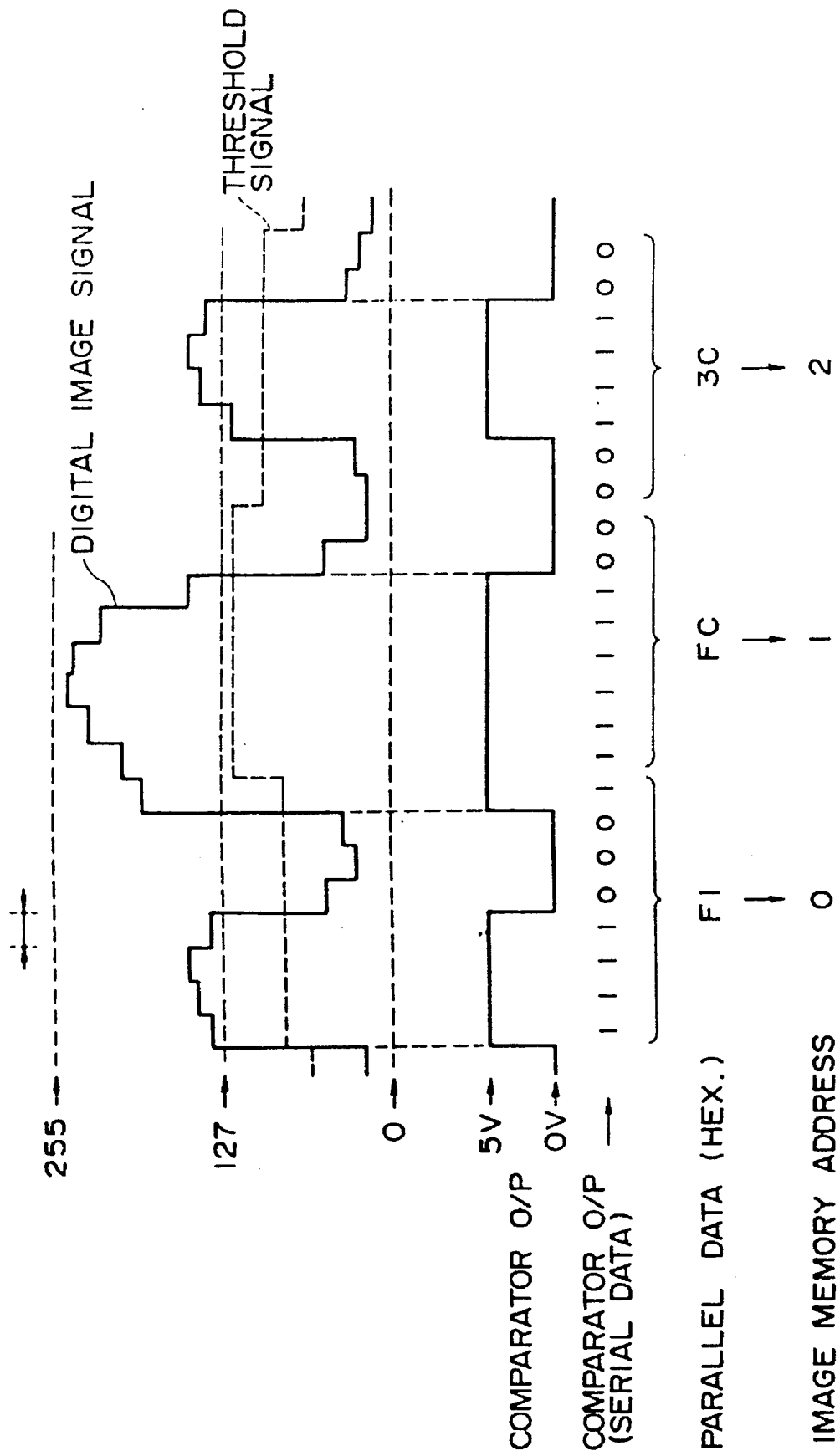
FIG. 7 is a timing chart illustrating the relationship between a digital image signal and its corresponding parallel data.

When the symbol data is read, the A/D converted image data is compared with the threshold data and 1-bit binary data is obtained. Eight 1-bit binary data are converted into one 8-bit parallel data by the serial/parallel converter 11, as described previously. This process is shown in the timing chart in FIG. 7.

The image data (digital) and the threshold data is compared on a pixel basis. If the image data is equal to or greater than the threshold data, a HIGH signal is outputted from the comparator 10. If the image data is less than the threshold data, a LOW signal is outputted.

Reading the threshold data from the non-volatile memory 13 is performed synchronously with the clock fCL which has a frequency of fCK/8. Comparison of the image data and the threshold data is performed synchronously with the clock fCK.

The CPU 15 has a memory for temporarily storing threshold data. The threshold data read out of the memory 13 is stored in the temporary memory. This threshold data is retained until the next data is loaded (using clock fCL). The CPU 15 transmits the same data to the comparator 10 eight times, since the same threshold data is used to compare 8 pixels.

The CPU 15 counts the clock signal fCL within a predetermined period of time and obtains the timing of horizontal and vertical synchronous signals. For example, when the number of pixels of one line is 512, the number of clock pulses (fCL) detected for 1H is 64. Thus the timing of the horizontal synchronous signal is known. As the blanking period is relatively long compared with the horizontal period, the vertical synchronous signal can be determined from clock signal fCL and the timing of the horizontal synchronous signal.

Since the CPU 15 has the function described above, the CPU 15 can control the addressing of each memory synchronously with the horizontal and vertical synchronous signals. The CPU 15 can transmit an instruction to start writing/reading to the memory controller 14 synchronously with the horizontal/vertical synchronous signals. Accordingly, a series of sequential image processes can be performed efficiently.

Figure 8:
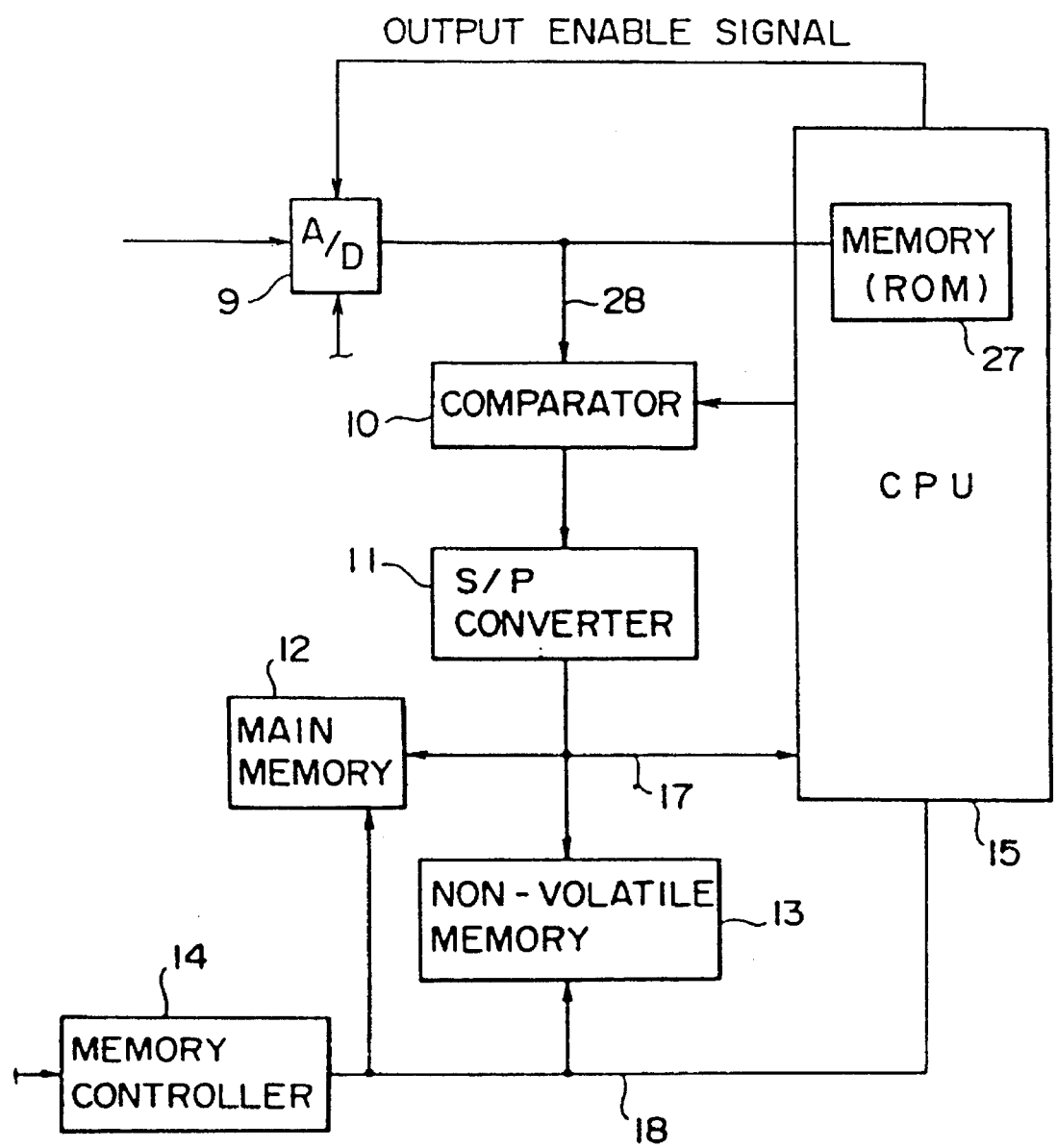
FIG. 8 is a block diagram showing a control unit and its peripheral circuitry.
Figure 19A:
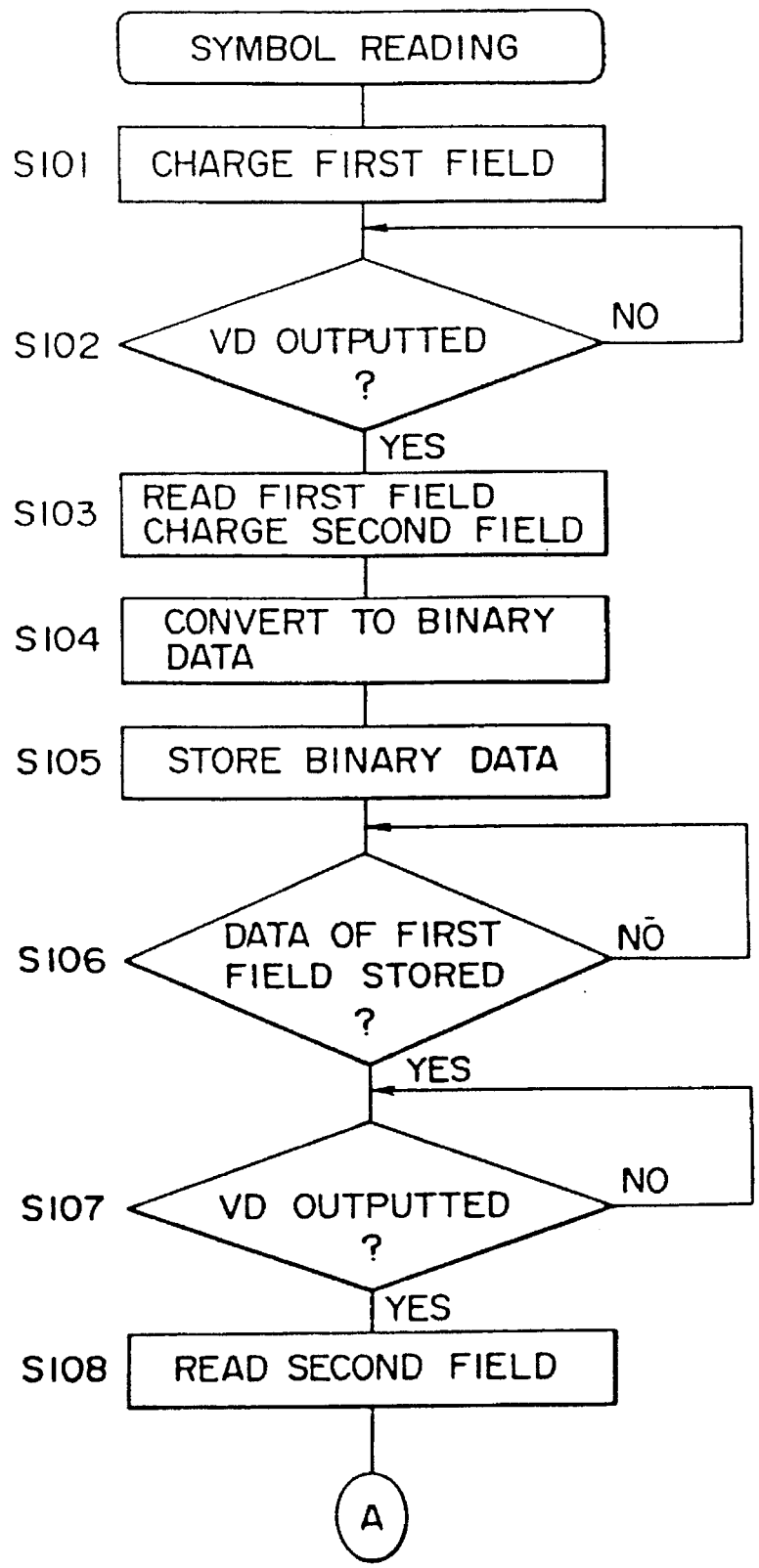
FIGS. 19A and 19B are flowcharts illustrating a symbol reading operation.
Figure 19B:
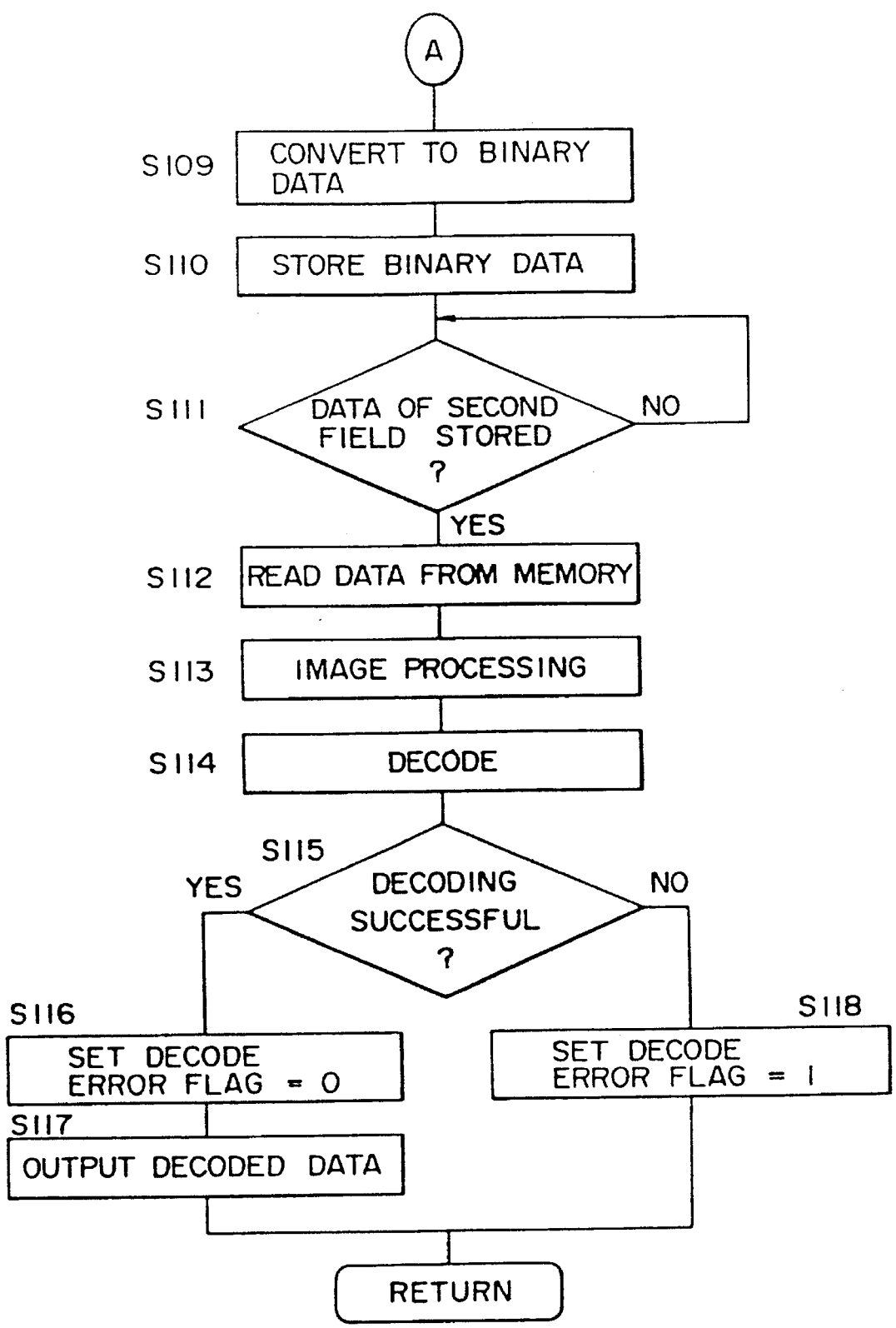

The 8-bit data output by the serial/parallel converter 11 is stored in the main memory 12 in S105 of FIG. 19A. In FIG. 8, the 1-bit binary data, the converted 8-bit data, and the memory addresses are shown.

If it is determined that the data for the first field has been stored at S106, control goes to S107 where VD is again output and the second field data is read at S108. This data is converted to binary data, compared with the threshold data and stored in steps S109 and S110, in a manner similar to the data for the first field.

Then it is determined whether the second field data has been stored, at S111. If all the second field data has been stored, the data can be read out of the main memory 12, in S112, then Image processed in S113 and decoded in S114. Since at each address, 8-bit data is stored, the writing and reading of image data can be performed quickly.

If the data is successfully decoded (S115:Y) then the decode error flag is set to 0 in S116, and the decoded data is output in S117. If the data is not successfully decoded, the decode error flag is set to 1. Thereafter control returns to step S11 of the main program where the decode error flag is checked.

If there is no error (decoding successful), the timer is started and the display 20 is modified to the OK mode. In S12. If the decoding has an error, the timer is started and the display 20 is modified to the NG mode, in S13.

If time has elapsed at S14, the display modes are released at S15 and the decode error flag is set to 0 at S16. If the main switch is OFF in S17, then the program ends, otherwise control returns to S1.

The testing function of the encoded symbol reading device will be described with reference to FIG. 8.

FIG. 8 shows part of the circuit shown in FIG. 3. The CPU 15 has a memory 27 which stores a reference image signal. The reference image signal is a sample image data used for testing or demonstration. Examples of reference data are shown in FIGS. 15 through 17, but are not limited to these. Any other data can be used as the reference data. Further, it is preferable that the reference data has a pattern that is similar to actual symbol data.

The A/D converter 9 and the memory 27 are connected to the comparator 10 through the common line 28. Thus, data from the A/D converter 9 and data from the memory 27 are selectively input to the comparator 10 through the same line 28.

When the reading mode is selected with the mode switch, the data in the memory 27 is not read, and is therefore not transmitted to the comparator 10. In this case, the CPU 15 sends an output-enable signal to the A/D converter 9. If the test mode is selected, the CPU 15 disables the A/D converter 9, inhibiting the output of an image signal), and the reference data is transmitted from the memory 27 to the comparator 10. The memory 27 also stores a reference threshold data. When the test mode is selected, the reference image data and the reference test data are transmitted to the comparator 10 and the 1-bit binary data is generated.

In the test mode, the comparator 10 outputs a 1-bit binary data based on the reference image data and the reference threshold data. The binary data is then stored in the memory 12 in a similar manner to that described above. When the 1-bit data for one frame have been stored in the memory 12, the data is transmitted to the CPU 15, image processing is applied, and then the data is decoded.

As described above, according to this embodiment, the operation of the comparator 10, the S/P converter 11, and the main memory 12 can be tested easily and accurately, without connecting any external testing devices.

In this embodiment, the reference data is stored in the memory 27. It is possible to store the reference data in another memory device such as a disk type recording medium.

Figure 9:
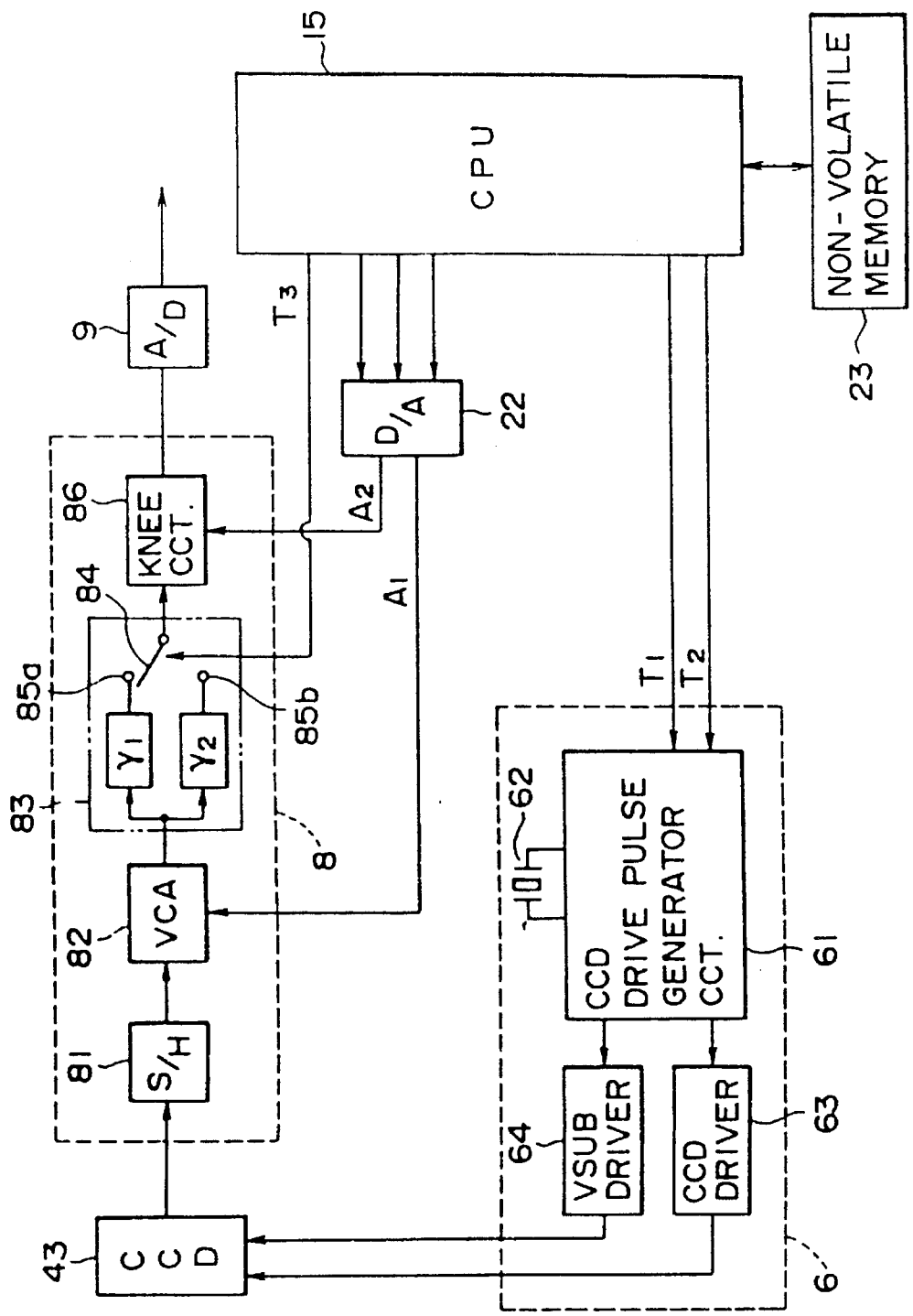
FIG. 9 is a block diagram showing a CCD (Charge Coupled Device) drive circuit and an amplifier circuit.

A second embodiment according to the present invention, is illustrated in FIG. 9. This is similar to the first embodiment described above but is provided with an exposure controlling system.

The CCD drive circuit 6 has a CCD drive pulse generator 61, a CCD driver 63, and a VSUB driver 64. The VSUB driver 64 controls the driving voltage of the CCD 43. When a VSUB signal transmitted from the VSUB driver 64 to the CCD 43 is LOW, the driving voltage is approximately 10 volts, to control blooming.

If the VSUB signal is HIGH, the driving voltage is set to 30–40 volts, and the CCD 43 is reset (discharged). By inputting the VSUB signal in the form of a periodic pulse signal, the accumulated charge in the CCD 43 is periodically cleared. Therefore, if the interval of the VSUB signal pulses, and the timing of the charge transferring from each pixel of the CCD 43 to a vertical transfer CCD are adjusted, the shutter speed can be changed as desired. Note that the transferring of the changes from pixels to the vertical transfer CCD is performed during the vertical blanking period.

The performance of the CCD drive pulse generator 61 is controlled by the CPU 15 through the control signal T1 and T2 (1-bit digital signals). That is, the shutter speed is selected based on the combination of the values of T1 and T2, which are shown in Table 1.

TABLE 1

| Shutter Speed | T1 | T2 |
| --- | --- | --- |
| 1/60 sec. | 0 | 0 |
| 1/125 sec. | 1 | 0 |
| 1/250 sec. | 0 | 1 |
| 1/500 sec. | 1 | 1 |

The amplifier 8 includes an S/H (sample hold circuit) 81, a VCA (voltage controlled amplifier) 82, a gamma compensation circuit 83, and a knee circuit 86. These are arranged relative to the CCD 43 as shown in FIG. 9. The VCA 82 is a circuit which changes its amplification (i.e., the sensitivity) in accordance with the voltage of a control signal A1.

There are two gamma compensation circuits having different gamma characteristics g1 and g2. The gamma circuits have terminals 85a and 85b, respectively. Switch 84 selects between one of the two characteristics g1 and g2. The gamma circuits are switched based on a control signal P3 (1-bit digital) transmitted from the CPU 15 as shown in Table 2 below.

TABLE 2

| characteristic | P3 |
| --- | --- |
| g1 | 0 |
| g2 | 1 |

Figure 10:
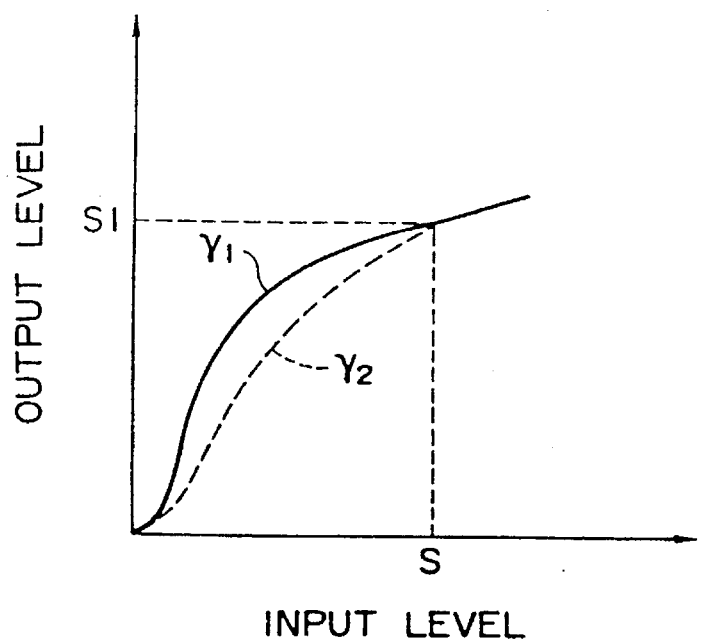
FIG. 10 is a graph showing a gamma characteristics between the amount of light and the output of the CCD circuit.

FIG. 10 shows the gamma characteristic g1 and g2 of the compensation circuits. The circuit modifies the input signal when the magnitude of the input signal is equal to or less than S. If the magnitude of the input signal is S, the output is S1, corresponding to a white display. If the input level is greater than S, the gamma characteristic becomes linear and the output is also S.

Figure 11:
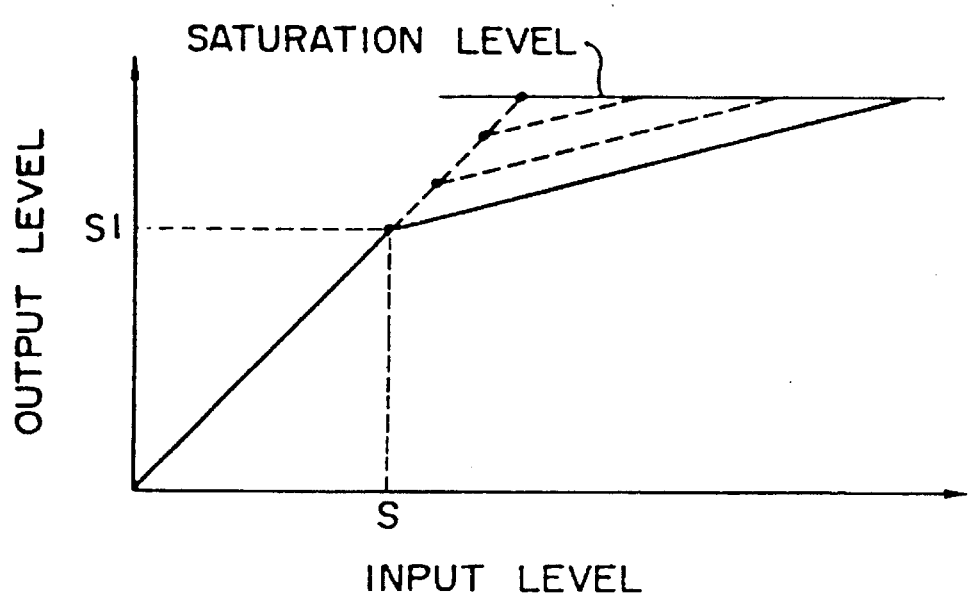
FIG. 11 is a graph showing the relationship between the amount of light incident on the CCD and the output of the CCD.

FIG. 11 shows the characteristic of the knee circuit 86. The knee circuit 86 compresses the data when the light amount is larger than S. Below this level the knee circuit 86 has a linear characteristic. As shown in FIG. 11. If the point from which the compression is applied is lowered, the saturation level becomes great. In the embodiment, the knee characteristics as shown in FIG. 11 are changed stepwisely based on the control signal A2 (analog voltage signal).

The control signals A1 and A2 are analog voltage signals, which are generated with a D/A converter 22 by converting digital signals outputted from the CPU 15 as shown in FIG. 9. The D/A converter 22 has two output channels, each can output one of sixteen-stepped voltages between 0 and 5 volts based on the serial data $D_1$ through $D_4$ output from the CPU 15. This is shown in FIG. 20.

Figure 12:
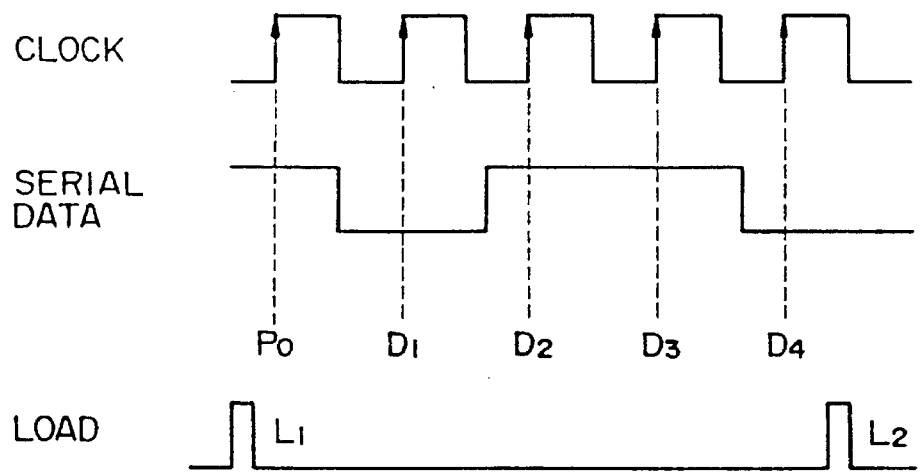
FIG. 12 is a timing chart showing a signal to be inputted to a D/A converter.

The CPU 15 also outputs a clock signal and a load signal to the D/A converter 22. FIG. 12 is a timing chart of these signals. After a first load signal L1 has been inputted, five bits of serial data $P_0$ and $D_1$ through $D_4$ is inputted synchronously with the clock pulse. When the second load signal L2 is inputted, the serial data $P_0 - D_1 - D_4$ is converted to a 5-bit parallel data inside the D/A converter 22, and further converted to the analog signals A1 and A2.

Figures 21, 22:
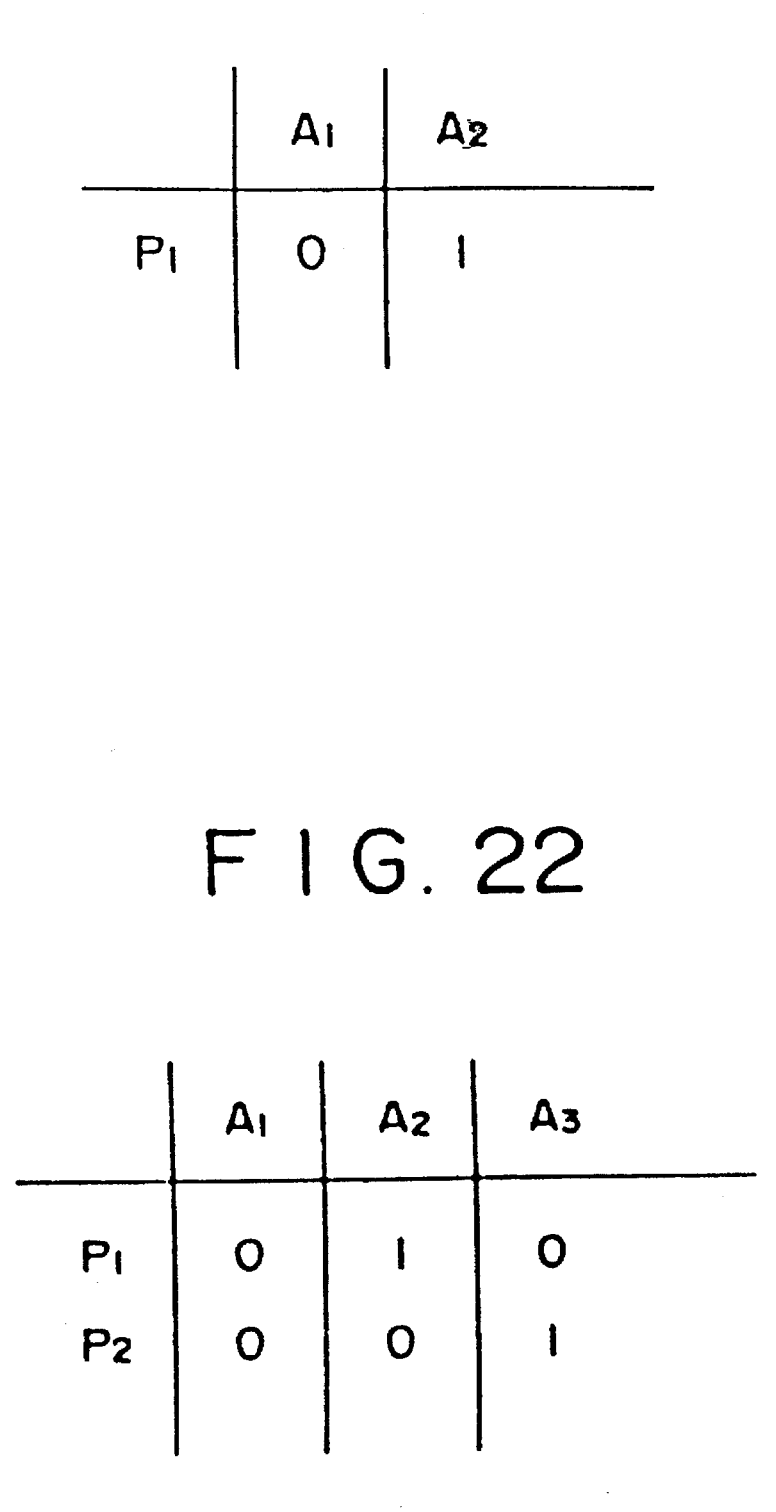

If the data $P_0 = 0$, the voltage A1 is generated, If $P_0 = 1$, A2 is generated (see FIG. 21). The value of the voltage A1 or A2 is determined based on the combination of the data $D_1 - D_4$; one of sixteen values is selected. When A1 or A2 is selected, the value is sent to the VCA 82 or knee circuit 86. The value that is sent is stored by the respective circuit until a new value is sent. The data T1–T3, $P_0$, $D_1 - D_4$ are stored in a non-volatile memory 23 which is connected to the CPU 15.

Figure 14:
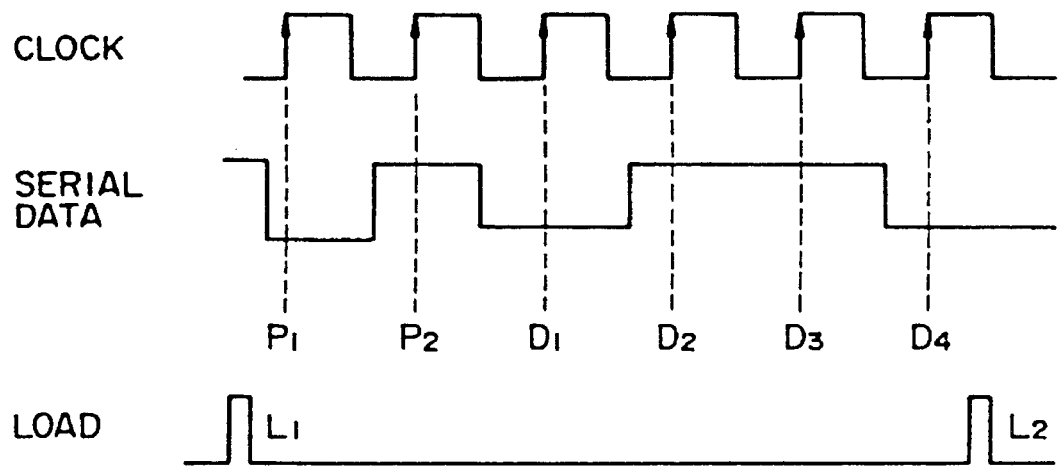
FIG. 14 is a timing chart showing a signal to be inputted to a D/A converter of the modified circuit shown in FIG. 13.
Figure 13:
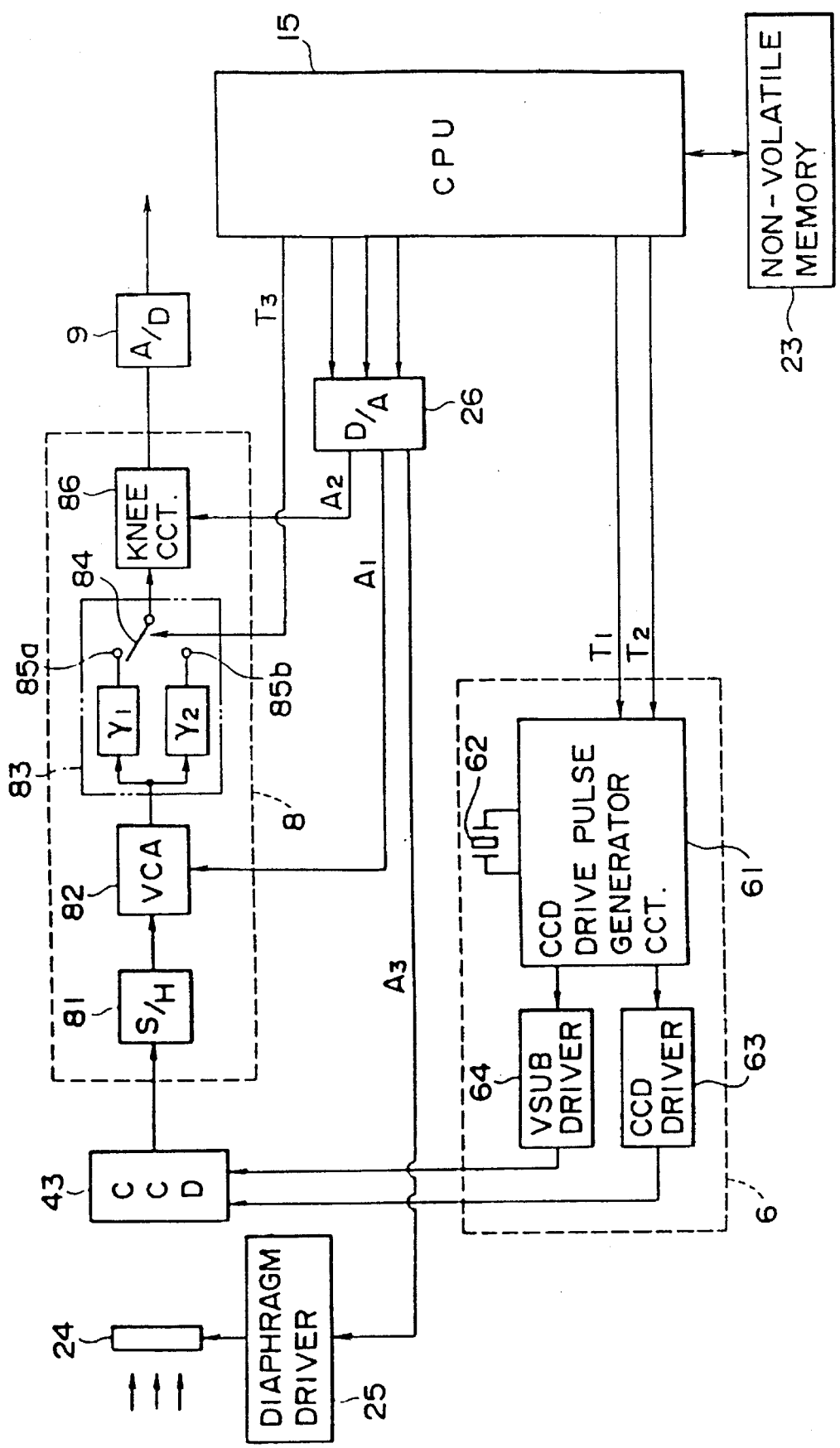
FIG. 13 is a block diagram showing modified CCD drive circuit and amplifier circuit.

FIG. 13 shows a third embodiment according to the present invention. This is similar to the second embodiment described above except that a diaphragm mechanism 24 and diaphragm driver 25 are provided. The diaphragm mechanism 24 is arranged in front of the CCD 43. The size of the aperture formed by the diaphragm mechanism 24 is changed by the driver 25. The driver 25 is controlled by the CPU 15 with the signal A3. The signal A3 is generated similarly to the signals A1 and A2; one of sixteen values. An extra bit $P_1$ is required in order for the signal A3 to be selected. The serial data required is shown in FIG. 14, and is similar to the serial data shown in FIG. 12 except for the extra bit. Similarly, the selection of A1. A2 and A3 with respect to $P_0$ and $P_1$ is shown in FIG. 22.

As described above, the encoded symbol reading device according to the present invention reads a symbol and outputs a signal to an external monitor. Further, two monitoring modes, through and cut, are provided to select whether the signal is to be displayed on the monitor.

The encoded symbol reading device reads the encoded symbol, compares the data obtained with threshold data stored in memory, converts the serial data output by the comparator to parallel data. The parallel data is then stored as 8-bit data in memory. The data is stored such that the address of the stored data corresponds to the horizontal and vertical synchronous signals generated by the synchronous generator. Thus the pattern of data stored in the memory resembles the pattern of actual data of each line scanned by the CCD.

The encoded symbol reading device also includes sample data stored in the memory. This is used to perform a self-test function, to confirm that the comparator, serial/parallel converter and main memory are all functioning normally. Further, the sample data can be used to give a demonstration of the functionality of the encoded symbol reading device.

The encoded symbol reading device is not limited to the embodiments described above, but can include various modifications. The external monitor and computer shown in FIG. 1 are connected to the encoded symbol reader through an external interface adapter. This interface adapter could through miniaturization, be incorporated into the encoded symbol reading device. Further a wireless link could be used to connect the encoded symbol reader to the external monitor and computer.

The threshold data is obtained by scanning a card having a uniform gray color across its entire surface. As described above, data for every eighth pixel is stored in the memory and used as the threshold data for eight pixels of a scanned symbol. However, fewer pixels could be stored as threshold data, with each pixel being used as the threshold data for more than eight pixels of a scanned symbol, with minimum loss in accuracy. Further, threshold data obtained for one field could be used for both fields when performing the scanning of the encoded symbol. This would reduce the memory requirements for storing the threshold data, and thus reducing the cost of the encoded symbol reading device.

Further, an 8-bit system has been illustrated, however a system employing a more advanced CPU having a word length of 16 bits or 32 bits can be employed. The memory 12 stores an 8-bit word, however the word length is determined by the processor, the data bus and the serial/parallel converter and is therefore not limited to an 8-bit length.

In the above described embodiments the output of the A/D converter and the serial/parallel converter are both 8-bits. This simplifies the design of the hardware required to construct the encoded symbol reading device, since only one data bus configuration is necessary.

When the monitor through mode is selected, the light source and CCD are continuously driven. Since the light source is primarily used to Illuminate an encoded symbol, the pressing of the trigger switch can be used to activate the driving of the light source. Therefore, the light source is not continuously on, and the power consumption of the encoded symbol reading device is reduced.

The present disclosure relates to subject matters contained in Japanese Patent Applications HEI 5-090620, HEI 5-090621, HEI 5-090622, HEI 5-090623, HEI 5-090624, and HEI 5-090625, all filed on Mar. 25, 1993, which are expressly incorporated herein by reference in their entirety.

What is claimed is:

1. An apparatus for reading an encoded symbol, comprising:
    means for reading an encoded symbol and outputting an image data corresponding to said encoded symbol;
    means for decoding said encoded symbol based on said image data:
    means for outputting a video signal corresponding to said image data to an external video monitor;
    memory means for storing test data;
    means for outputting said test data;
    means for initiating a test operation; and,
    means for controlling said device in such a fashion that, when said test operation is initiated, said means for outputting said test data outputs said test data, and said reading means is disabled.

2. The device according to claim 1, wherein said reading means comprises:
    an image sensor for receiving light from said encoded symbol and outputting an analog signal corresponding to the received light; and
    means for adjusting an amount of light to be received by said image sensor.

3. A device for reading an encoded symbol and outputting image data corresponding to a read encoded symbol, said apparatus comprising:
    means for decoding said output image data;
    means for storing reference test data;
    means for initiating a test operation; and,
    means for controlling said decoding means to stop decoding said output image data and to start decoding said stored reference test data in response to an actuating of said test operation initiating means.

* * * * *